United States Patent
Li et al.

(10) Patent No.: US 10,104,645 B2
(45) Date of Patent: Oct. 16, 2018

(54) RANDOM ACCESS METHOD OF DEVICES WITH DIFFERENT PATH LOSS

(71) Applicant: QUALCOMM Incorporated, San Diego, CA (US)

(72) Inventors: Junyi Li, Chester, NJ (US); Frank Anton Lane, Easton, PA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 14/553,980

(22) Filed: Nov. 25, 2014

(65) Prior Publication Data

US 2016/0105884 A1 Apr. 14, 2016

Related U.S. Application Data (60) Provisional application No. 62/062,126, filed on Oct. 9, 2014.

(51) Int. Cl.
*H04W 4/00* (2018.01)
*H04W 72/04* (2009.01)
*H04L 5/00* (2006.01)
*H04W 74/08* (2009.01)
*H04W 4/50* (2018.01)

(52) U.S. Cl.
CPC ....... *H04W 72/0413* (2013.01); *H04L 5/0092* (2013.01); *H04W 74/0833* (2013.01); *H04W 4/50* (2018.02)

(58) Field of Classification Search
CPC .... H04L 1/0026; H04L 1/0073; H04W 28/04; H04W 28/044; H04W 28/046; H04W 28/048; H04W 74/085; H04W 74/0858
See application file for complete search history.

(56) References Cited

U.S. PATENT DOCUMENTS

| | | | |
|---|---|---|---|
| 7,289,467 B2 | 10/2007 | Bourlas et al. | |
| 7,839,761 B2 * | 11/2010 | Kim | ...... H04L 1/0003 370/204 |
| 2010/0046425 A1 * | 2/2010 | Baldemair | ...... H04J 13/00 370/328 |

(Continued)

FOREIGN PATENT DOCUMENTS

| | | |
|---|---|---|
| WO | 2010123430 A1 | 10/2010 |
| WO | 2011017281 | 2/2011 |

(Continued)

OTHER PUBLICATIONS

International Search Report and Written Opinion—PCT/US2015/052449—ISA/EPO—dated Dec. 16, 2015.

(Continued)

*Primary Examiner* — Alvin Zhu
(74) *Attorney, Agent, or Firm* — Arent Fox, LLP (57) ABSTRACT

A method, an apparatus, and a computer program product for wireless communication are provided. According to one embodiment, a method of operating a device includes: selecting a signal format from a plurality of signal formats, each of the plurality of signal formats corresponding to a respective coding and modulation scheme of a plurality of coding and modulation schemes; and sending a request for random access to a base station according to the selected signal format.

10 Claims, 9 Drawing Sheets

(56) References Cited

U.S. PATENT DOCUMENTS

| | | | |
|---|---|---|---|
| 2013/0095748 A1* | 4/2013 | Hu | H04L 1/0003 |
| | | | 455/8 |
| 2014/0016573 A1 | 1/2014 | Nuggehalli et al. | |
| 2014/0098773 A1 | 4/2014 | Yoo et al. | |
| 2014/0153517 A1* | 6/2014 | Chen | H04W 74/0833 |
| | | | 370/329 |
| 2014/0198677 A1 | 7/2014 | Xu et al. | |
| 2014/0247799 A1* | 9/2014 | Suzuki | H04W 74/0833 |
| | | | 370/329 |
| 2015/0249971 A1* | 9/2015 | Yu | H04W 72/085 |
| | | | 370/330 |
| 2015/0334653 A1 | 11/2015 | Ang et al. | |
| 2016/0050660 A1* | 2/2016 | Hofstrom | H04W 72/0446 |
| | | | 370/329 |

FOREIGN PATENT DOCUMENTS

| | | | |
|---|---|---|---|
| WO | 2013123445 A1 | 8/2013 | |
| WO | 2013142040 A1 | 9/2013 | |
| WO | 2013169974 A1 | 11/2013 | |

OTHER PUBLICATIONS

Qualcomm Incorporated, et al., "Device to Device Communication", 3GPP Draft, R2-141681 Stage 2 CR D2D Communication, 3rd Generation Partnership Project (3GPP), Mobile Competence Centre, 650, Route Des Lucioles, F-06921 Sophia-Antipolis Cedex, France vol. RAN WG2, no. Valencia, Spain, 20140331-20140404, Mar. 22, 2014 (Mar. 22, 2014), 9 Pages, XP050792815, Retrieved from the Internet: URL: http://www.3gpp.org/ftp/Meetings_3GPP_SYNC/RAN2/Docs/ [retrieved on Mar. 22, 2014].

* cited by examiner

RANDOM ACCESS METHOD OF DEVICES WITH DIFFERENT PATH LOSS

CROSS-REFERENCE TO RELATED APPLICATION(S)

This application claims the benefit of U.S. Provisional Application Ser. No. 62/062,126, entitled "RANDOM ACCESS METHOD OF DEVICES WITH DIFFERENT PATH LOSS" and filed on Oct. 9, 2014, which is expressly incorporated by reference herein in its entirety.

BACKGROUND

Field

The present disclosure relates generally to communication systems, and, more particularly, to mobile communication systems for supporting applications that may require relatively low throughput (e.g., Internet of Things (IoT) applications).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

SUMMARY

According to aspects of the disclosure, a mobile communication system that operates according to one or more of the noted standards is utilized to support an application that may require relatively low throughput (e.g., an IoT application).

In an aspect of the disclosure, a method, a computer program product, and an apparatus are provided. According to one embodiment, a method of operating a device includes: selecting a signal format from a plurality of signal formats, each of the plurality of signal formats corresponding to a respective coding and modulation scheme of a plurality of coding and modulation schemes; and sending a request for random access to a base station according to the selected signal format.

According to one embodiment, a method of operating a base station includes: monitoring a predetermined set of time and frequency resources to receive a request for random access from a device; determining a signal format of the request from among a plurality of signal formats, each of the plurality of signal formats corresponding to a respective coding and modulation scheme of a plurality of coding and modulation schemes; and recovering the request based on the determined signal format.

DETAILED DESCRIPTION

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Figure 1:
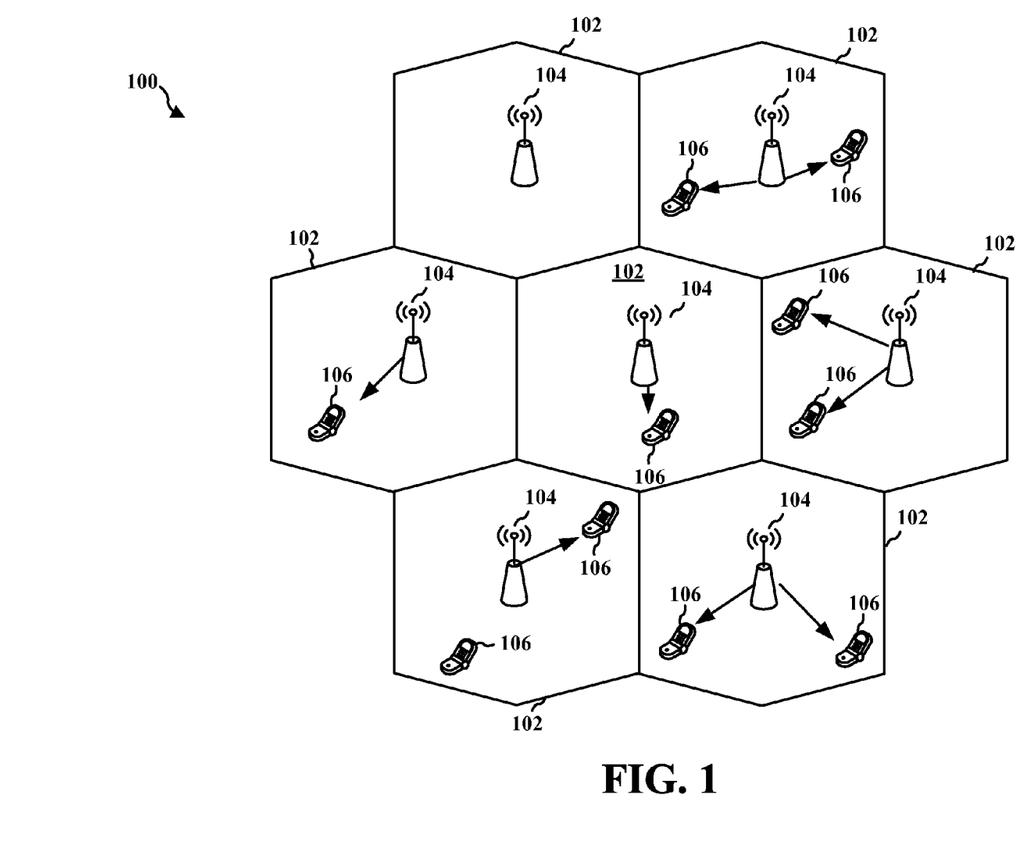
FIG. 1 is a diagram illustrating an example of an access network.

FIG. 1 is a diagram illustrating an example of an access network 100. In this example, the access network 100 is divided into a number of cellular regions (cells) 102. Each evolved Node B (eNB) 104 may support one or multiple (e.g., three) cells. The term "cell" can refer to the smallest coverage area of an eNB and/or an eNB subsystem serving a particular coverage area. The eNB 104 may also be referred to as a base station, a Node B, an access point, a base transceiver station, a radio base station, a radio transceiver, a transceiver function, a basic service set (BSS), an extended service set (ESS), or some other suitable terminology. Further, the terms "eNB," "base station," and "cell" may be used interchangeably herein.

The base station 104 provides an access point (e.g., to an evolved packet core (EPC)) for a device 106. Each of the devices 106 may be in communication with one or more of the base stations 104. According to aspects of the disclosure, the device 106 may be a device configured to operate in an Internet of Things (IoT) network. Such a device may conduct data transfers that are infrequent and/or short in length. For example, for a particular application, the device 106 may conduct data transfers once per hour or once every few hours, or may send 20 to 100 bytes in a particular data transfer.

Examples of devices 106 in an IoT network may include user equipment (UEs) such as heart monitoring implants, biochip transponders, communication devices installed in kitchen appliances, and smart thermostat devices that may be installed in open environments.

Although devices 106 are described in this disclosure with respect to an IoT network, it is understood that other examples of the device 106 may include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The device 106 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The modulation and multiple access scheme employed by the access network 100 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Cellular systems operating in licensed spectrum may have some important potential advantages compared with alternative technologies (e.g., technologies using unlicensed spectrum). For example, a cellular system can re-use existing base station infrastructure and licensed spectrum. In principle, this should allow such a system to achieve a significantly better link budget, quality of service, scalability, and ease of deployment with respect to systems that attempt to use licensed-exempt (or unlicensed) spectrum.

However, the re-use of existing cellular infrastructure and spectrum for a particular application may raise certain considerations. For example, the nature and requirements of the particular application may be different (or even substantially different) from the applications for which the existing cellular systems were designed and optimized. For example, in the case of an IoT application, a typical traffic model for low throughput devices may require that the IoT network primarily support infrequent and/or small data transfers for each device (for example, data transfers occurring once per hour or once every few hours, data transfers having a size of 20 to 100 bytes).

In the case of an IoT application, an additional consideration may be related to UE cost. For example, it may be preferable that the cost of a UE be kept much lower than a UE typically associated with General Packet Radio Service (GPRS). In this regard, the preferred cost of the UE may be closer to Bluetooth Smart and Zigbee than current GPRS solutions. Another consideration may be related to battery life. For example, it may be preferable that battery life be prolonged compared with GPRS. In this regard, the preferred battery life may be on the order of many years, assuming reasonable traffic models. Yet another consideration may be related to cellular coverage. For example, it may be preferable that indoor coverage be enhanced compared with GPRS. In this regard, it may be contemplated that: UEs may be located deep indoors; the UEs may remain stationary in poor coverage locations; and/or the UEs may have rather poorly functioning antennas due to form-factor and other cost constraints.

According to aspects of the disclosure, a random access of a base station is configured to address one or more of the above considerations.

Regarding random access, in a cellular system, a set of resource blocks may be used by a UE to perform initial system access and achieve UL synchronization. A request for random access may include a random access preamble that occupies a particular bandwidth. The transmission of the random access preamble may be restricted to certain time and frequency resources.

In a typical cellular system such as LTE, a UE sends a request for random access in order to access a base station. Specifically, the UE receives a downlink signal from the base station and measures the strength of the signal to determine the transmit power of a random access signal. Open loop power control is employed such that the UE targets a given receive power of the random access signal at the base station. Furthermore, the modulation and coding scheme of the random access signal that is sent by the UE is fixed so as to simplify processing at the base station receiver.

The design described in the previous paragraph may be effective for those systems in which the UEs may be phones or smartphones and/or systems in which requests for random access constitute a minor overhead (e.g., a relatively small portion of the entire communication session between the UE and the base station).

However, for other systems (e.g., IoT systems), the noted design may not be quite as effective. This may be because the payload size of the IoT system is usually very small, e.g., on the order of 100 bytes for each data transaction. As a result, requests for random access may constitute a more significant portion of the entire communication session between the UE and the base station. As such, aspects of the disclosure are directed towards optimizing the random access design for IoT and other applications. In particular, certain aspects are directed toward optimizing (e.g., reducing) battery power consumption. To a certain extent (which may be considerable), battery power consumption may depend on the duration(s) of time during which the UE transmits data.

Figure 2:
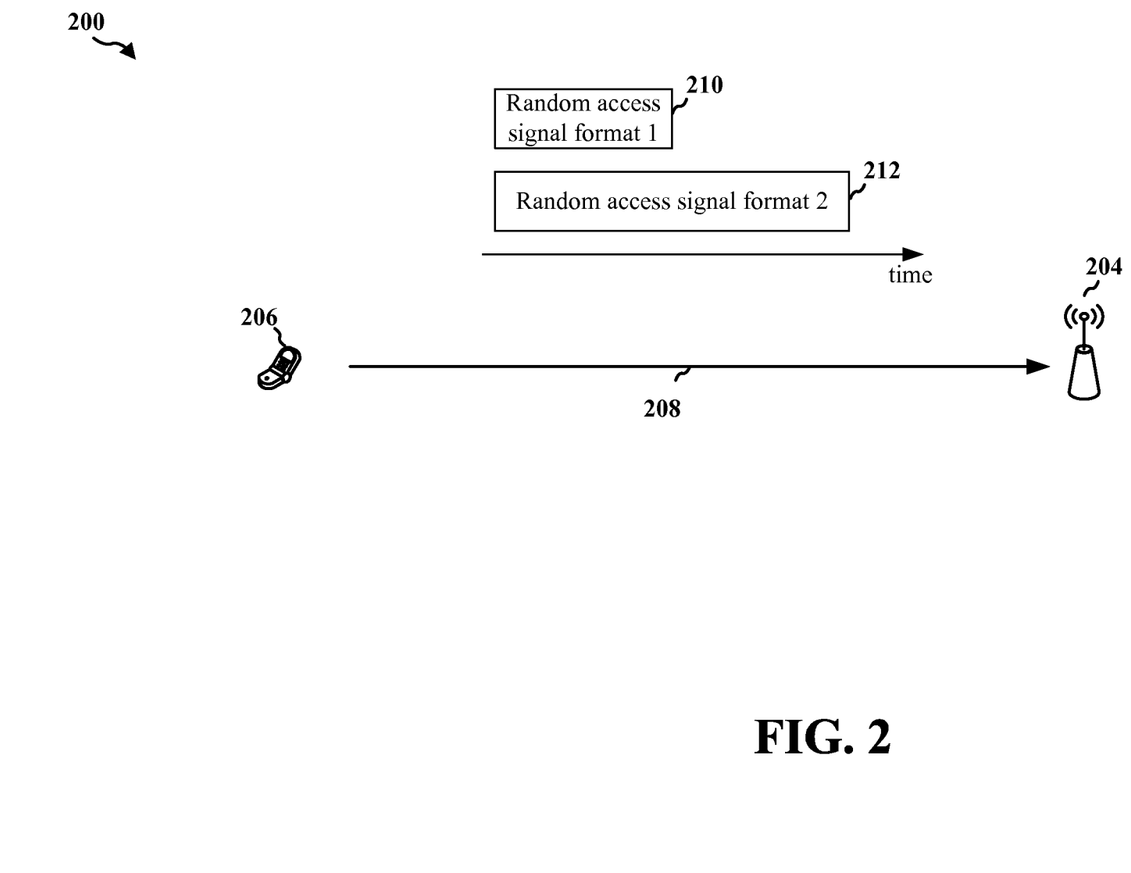
FIG. 2 is a diagram illustrating an example of sending a request for random access.

FIG. 2 is a diagram 200 illustrating an example of sending a request for random access. With reference to FIG. 2, the device 206 sends a request 208 for random access to the base station 204. The device 206 may be an IoT UE.

Before sending the request 208, the device 206 may determine a path loss between the device and the base station 204. The path loss reflects an attenuation of an electromagnetic wave as it propagates from/to the device 206 to/from the base station 204. The path loss may be measured in a manner similar to the manner in which a GPRS UE measures path loss. For example, the device 206 may determine the path loss by averaging measurements of the downlink Reference Signal Received Power (RSRP). In this regard, the device 206 may measure signals transmitted by the base station 204. The measurements may involve calculating a running average of the measured signal power over a fixed time period.

The determined path loss may be used to send the request 208 for random access. In addition, the determined path loss may be stored at the device 206 to facilitate a subsequent request for access.

For sending the request for random access, the device 206 selects a signal format from two or more signal formats (e.g., signal formats 210, 212). Each of the signal formats may correspond to a respective coding and modulation scheme (e.g., a different coding and modulation scheme). Also, each of the signal formats may correspond to a predetermined frequency bandwidth. Also, each of the signal formats may correspond to a respective time duration. The time duration of a given signal format may depend on its corresponding coding and modulation scheme.

For example, the time duration may correspond to a predetermined number of symbols, and may be different for the signal formats (e.g., signal formats 210, 212 of FIG. 2). Accordingly, transmitting the request 208 may require a shorter or longer duration of time depending on the signal format that is selected. With reference to FIG. 2, the signal format 212 corresponds to a time duration that is twice as long as the time duration corresponding to the signal format 210. Therefore, if the signal format 212 is selected and the request 208 is sent according to the signal format 212, the time required to transmit the request 208 will be twice as long relative to the situation in which the signal format 210 is selected and the request 208 is sent according to the signal format 210.

The predetermined frequency bandwidth may correspond to a predetermined number of subcarriers.

With respect to the different coding and modulation schemes of the signal format, a first signal format (e.g., signal format 212) may be more robust than a second signaling format (e.g., signal format 210). For example, binary phase shift keying (BPSK) may correspond to the first signal format, and quadrature phase shift keying (QPSK) may correspond to the second signal format. BPSK (in which only 1 information bit is encoded per symbol) is considered to be highly robust. For example, BPSK is more robust than QPSK (in which 2 information bits are encoded per symbol). The difference in robustness between BPSK and QPSK is related to the difference in minimum constellation point distance between the two modulation schemes. Generally, a larger constellation point distance corresponds to a higher level of robustness.

As noted earlier, each BPSK symbol carries 1 fewer information bit than each QPSK symbol. Therefore, transmitting a request 208 according to a signal format that corresponds to BPSK (e.g., signal format 212) will require transmitting twice as many symbols as transmitting the request 208 according to a signal format that corresponds to QPSK (e.g., signal format 210). Therefore, if signal format 212 is chosen over signal format 210, the time required to transmit the request 208 is doubled. An increase in transmission time results in an increase in power consumption. Accordingly, transmitting the request 208 using BPSK consumes more battery power than transmitting the request 208 using QPSK.

Also with respect to the different coding and modulation schemes of the signal formats, according to another example, a code rate of $\frac{1}{3}$ may correspond to the second signal format (e.g., signal format 212), and a code rate of $\frac{2}{3}$ may correspond to the first signal format (e.g., signal format 210). The code rate of $\frac{1}{3}$ (in which a total of 3 bits carry only 1 bit of useful information) is more robust than the code rate of $\frac{2}{3}$ (in which a total of 3 bits carry 2 bits of useful information). The difference in robustness is related to the difference in the number of redundant bits: 2 bits in the code rate of ⅓, versus 1 bit in the code rate of ⅔.

As noted earlier, data encoded at a code rate of ⅓ carries half as much useful information as data that is encoded at a code rate of ⅔. Therefore, transmitting a request 208 that is encoded at a code rate of ⅓ will require twice as long as transmitting the request 208 that is encoded at a code rate of ⅔. Accordingly, transmitting the request 208 using a code rate of ⅓ consumes more power than transmitting the request using a code rate of ⅔.

According to aspects of the disclosure, a signal format is selected from two or more signal formats (e.g., signal formats 210, 212) to obtain a level of robustness that is desired. At least two of the signal formats are based on different coding and modulation schemes. For example, a particular modulation scheme (or a particular code rate) corresponding to a particular signal format is effectively selected to obtain a desired level of robustness. The desired robustness level may depend on one or more factors, e.g., the determined path loss between the device 206 and the base station 204. Alternatively (or in addition), the level of robustness that is desired may depend on the transmit power capability of the device 206.

Such aspects may be distinguishable from a situation in which the length and coding and modulation of a random access signal (e.g., a signal carrying a request that may be similar to request 208) is fixed for one or more devices. In that situation, the signal format may have been fixed to increase the likelihood that a random access signal that is transmitted by a particular device (e.g., the device suffering from the highest path loss) will successfully reach the base station.

In an IoT system, the worst case path loss may be greater than that observed in a typical phone system (e.g., GPRS). This may be because IoT UEs may be located deep indoors and/or because IoT UEs may remain stationary in poor coverage locations. Moreover, the transmit power capability of an IoT UE may be weaker (e.g., than a GPRS UE). In accordance with the situation described in the above paragraph, in order to address the worst case scenario, a relatively conservative coding and modulation (e.g., BPSK, rate-⅓ coding) and several times of repetition may be adopted for transmission of the random access signal (e.g., request 208).

The above approach may lead to an unnecessarily long transmission time for other IOT UEs (e.g., IOT UEs that do not suffer from worst case path loss). The conservative design described above may be appropriate for the worst case scenario, but may be unnecessarily burdensome for other scenarios where the path loss is not as large and the IoT UE can finish the transmission of the random access signal (e.g., request 208) in a shorter amount of time, thereby reducing power consumption.

In accordance with aspects of the disclosure, multiple signal formats (e.g., signal formats 210, 212) are employed for the random access signal (e.g., request 208) corresponding to different coding and modulation schemes and transmission time durations. As described earlier, transmission of the signal format 212 takes twice as long as transmission of the signal format 210. According to one aspect, the signal format 212 is selected by the device 206 if the path loss that it experiences is relatively large (e.g., larger than a threshold value). According to one aspect, the signal format 210 is selected by the device 206 if the path loss that it experiences is relatively small (e.g., smaller than a threshold value).

The selected signal format may be used to send the request for random access. For example, the device may send a request for random access according to the selected signal format. In addition, the selected signal format may be stored at the device to facilitate a subsequent request for access.

The target receive power (e.g., the power at which the request 208 is received at the base station 204) may be different for different signal formats. The device 206 may determine which of the multiple signal formats (e.g., signal formats 210, 212) is to be used as a function of the measured path loss and/or the transmit power capability of the device. According to one embodiment, the device 206 stores information regarding path loss and/or format selection from a previous communication session and determines the random access signal format as a function of the stored information. The previous communication session may have been conducted with the base station 204.

According to aspects of the disclosure, one of several ways to manage the time frequency resource space for the random access signal (e.g., the request 208 of FIG. 2) may be utilized.

Figure 3A:
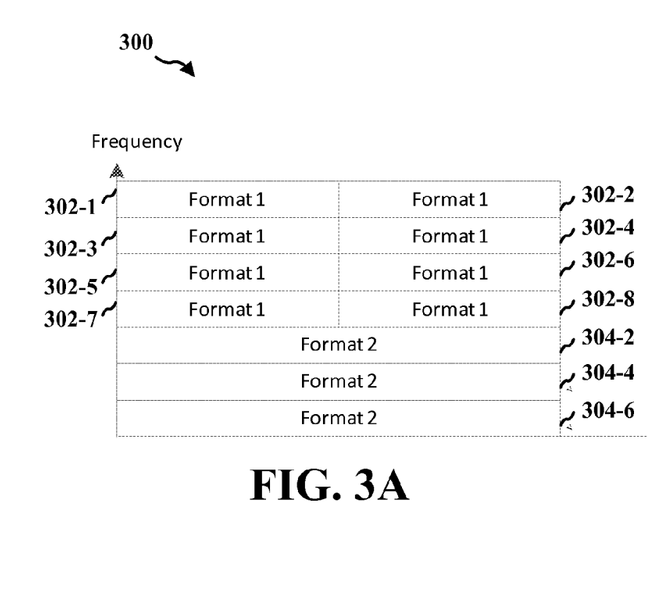
FIGS. 3(a) and 3(b) illustrate examples of time-frequency resource utilization.
Figure 3B:
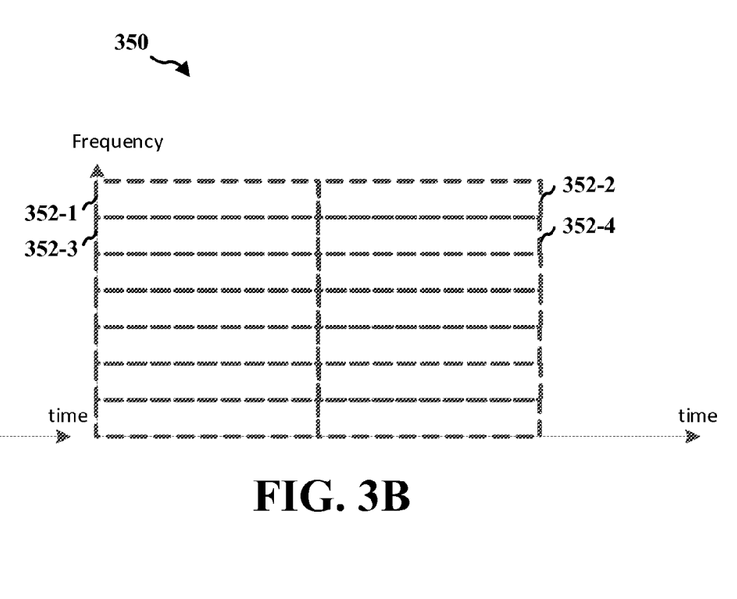

FIGS. 3(a) and 3(b) illustrate examples of time-frequency resource utilization.

With reference to FIG. 3(a), time-frequency resources 300 are utilized such that the random access channel resource is partitioned into multiple, non-overlapping, blocks. Each block corresponds to one signal format (e.g., signal format 210, 212). Each block may have a size (e.g., number of symbols and number of subcarriers) corresponding to a particular signal format.

For example, a request that is based on a particular signal format (e.g., signal format 210 of FIG. 2) may be sent/received in any of blocks 302-1, 302-2, 302-3, 302-4, 302-5, 302-6, 302-7, 302-8, each of which has a size corresponding to the signal format. Also, a request that is based on another particular signal format (e.g., signal format 212 of FIG. 2) may be sent/received in any of blocks 304-2, 304-4, 304-6, each of which has a size corresponding to that other signal format.

Accordingly, a request that is based on signal format 210 would not be sent/received in any of blocks 304-2, 304-4, 304-6, and a request that is based on signal format 212 would not be sent/received in any of blocks 302-1, 302-2, 302-3, 302-4, 302-5, 302-6, 302-7, 302-8. The allocations between signal formats and the noted blocks are known at the device (e.g., device 206) and at the base station (e.g., base station 204). As such, processing of a receiver at the base station may be simplified. For example, the base station may specify the allocations in a downlink broadcast channel so that the device learns the allocations from the broadcast channel and then selects one of the signal formats to use.

With reference to FIG. 3(b), time-frequency resources 350 are utilized such that the random access channel resource is partitioned into multiple, non-overlapping, blocks (e.g., blocks 352-1, 352-2, 352-3, 352-4). With reference to FIG. 3(b), any signal format (e.g., signal format 210 or 212) can be used in any resource block(s). Unlike the resource blocks 302, 304 of FIG. 3(a), resource blocks 352 are not a priori partitioned (e.g., partitioned at an earlier time) to correspond to a specific signal format. As disclosed earlier with reference to FIG. 3(a), different signal formats use non-overlapping resource blocks such that a given resource block is used only by one specific signal format. With reference to FIG. 3(b), a given resource block may be used by signals of two or more different formats.

For example, a request that is based on a particular signal format (e.g., signal format 210 of FIG. 2) may be sent/received in any of blocks 352-1, 352-2, 352-3, 352-4. Also, a request that is based on another particular signal format (e.g., signal format 212 of FIG. 2) may be sent/received in a pair of blocks (e.g., the pair of blocks 352-1 and 352-2, the pair of blocks 352-3 and 352-4). This utilization affords the device (e.g., device 206) more flexibility. However, it requires that the base station (e.g., base station 204) detect the format and then recover the signal once it receives signals in the time-frequency resources. Accordingly, the utilization of FIG. 3(b) has better channel resource utilization but perhaps at the cost of increased base station receiver complexity. To assist the base station receiver in detecting a request for random access, a random access signal (e.g., request 208) may start with a preamble, which consists of a known waveform. According to a further aspect, the preamble is the same for all the formats (e.g., signal formats 210, 212).

Although aspects of the disclosure are described with respect to IoT devices, it is understood that such aspects may be applied to other devices/situations. For example, disclosed aspects may be applied to situations in which a UE (e.g., a UE in a GPRS system) sends only infrequent and small data transfers and/or in which the UE desires (or is required to) conserve power.

Figure 4:
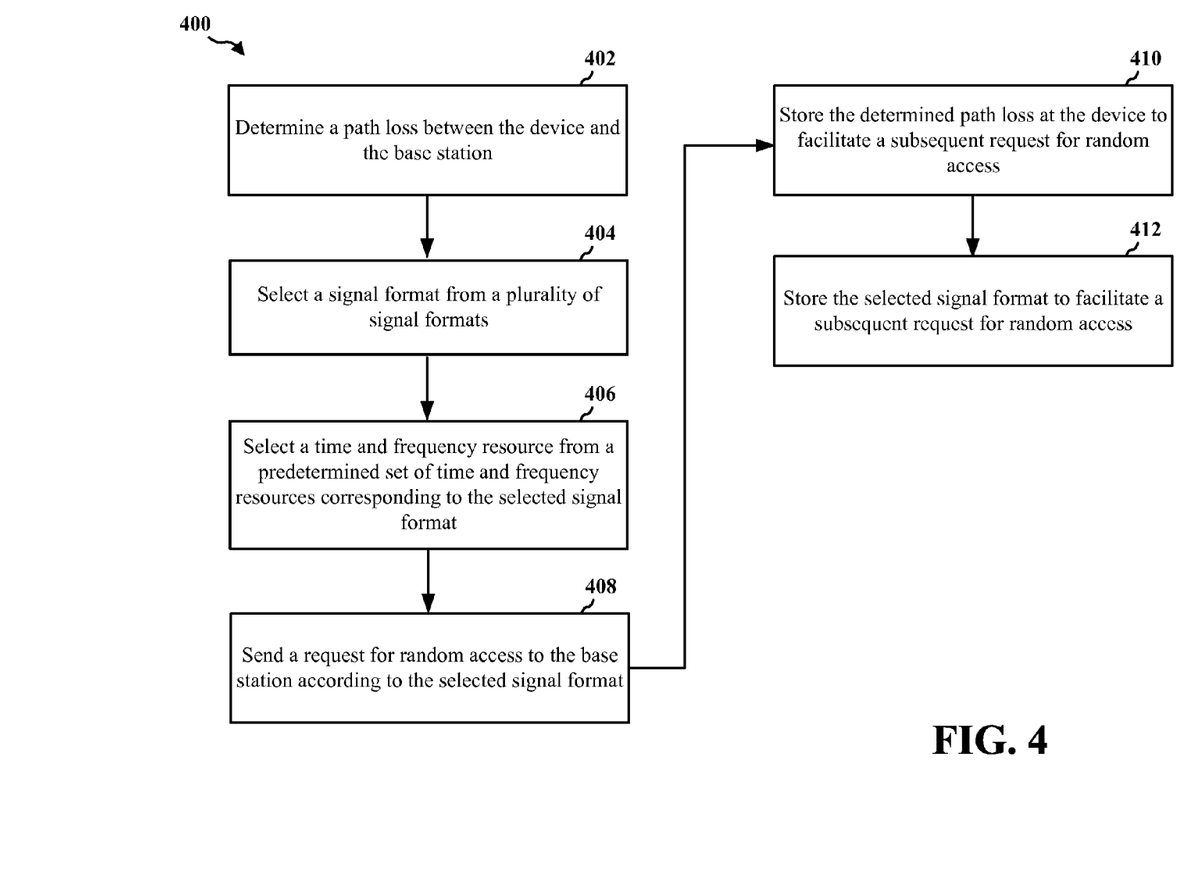
FIG. 4 is a flow chart of a method of operating a device.

FIG. 4 is a flow chart 400 of a method of operating a device. The method may be performed by a UE (e.g., the device 106, 206). At 402, the device determines a path loss between the device and the base station. For example, with reference to FIG. 2, the UE 206 determines a path loss between it and a nearest base station 204. At 404, the device selects a signal format from a plurality of signal formats. For example, with reference to FIG. 2, the UE 206 selects a signal format from among signal format 210 and signal format 212. At 406, the device selects a time and frequency resource from a predetermined set of time and frequency resources corresponding to the selected signal format. For example, with reference to FIG. 3(a), the UE selects a block (e.g., block 302-1, 302-2, . . . , 302-8 or 304-2, 304-4, 304-6) corresponding to the selected signal format. As another example, with reference to FIG. 3(b), the UE selects any one or more blocks (e.g., from among blocks 352-1, 352-2, . . . ) as suitable for the selected signal format. At 408, the device sends a request for random access to the base station according to the selected signal format. For example, with reference to FIG. 2, the UE 206 sends a request for random access to the base station 204 according to the selected signal format. At 410, the device stores the determined path loss to facilitate a subsequent request for random access. Finally, at 412, the device stores the selected signal format to facilitate a subsequent request for random access.

Figure 5:
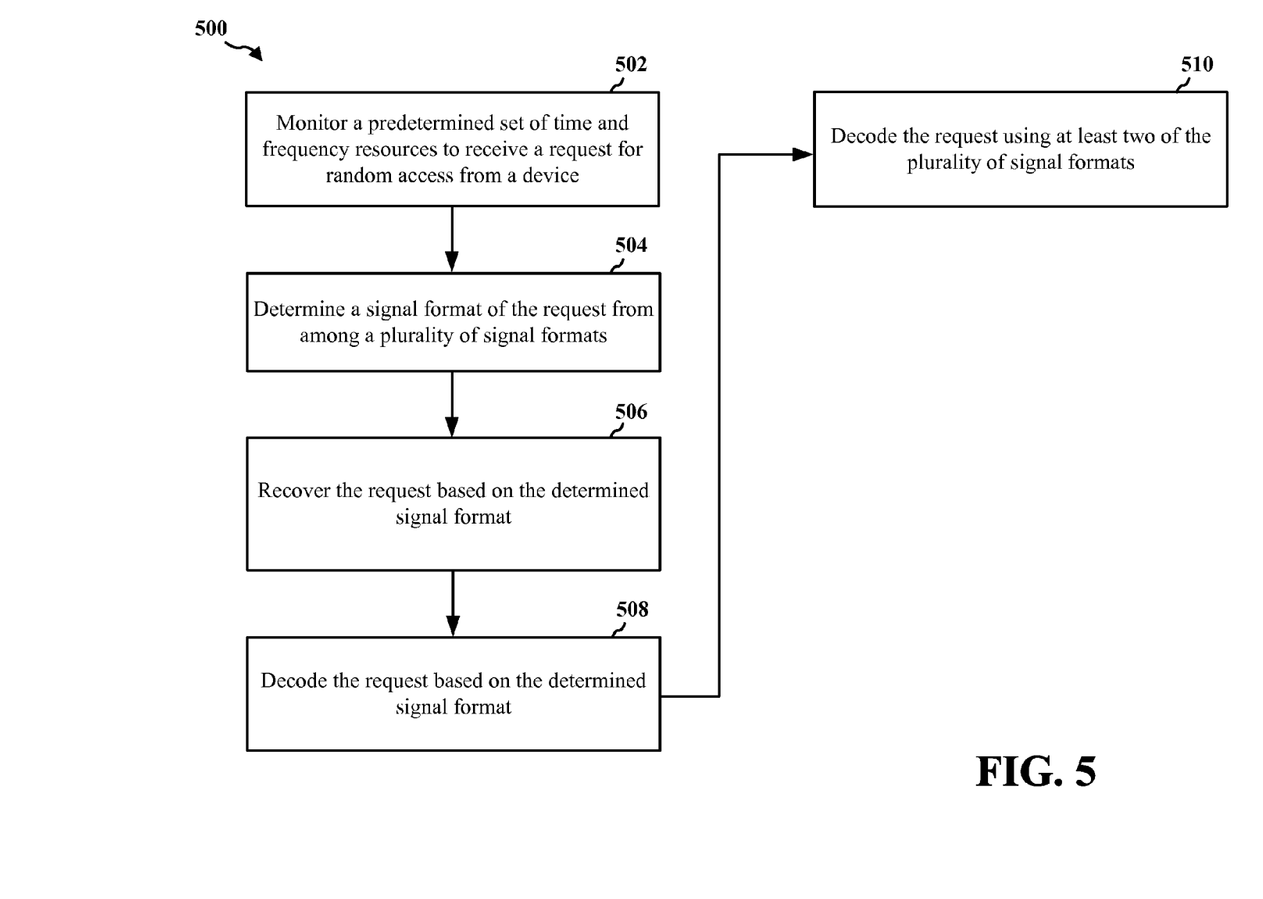
FIG. 5 is a flow chart of a method of operating a base station.

FIG. 5 is a flow chart 500 of a method of operating a base station. The method may be performed by the base station (e.g., the base station 104, 204). At 502, the base station monitors a predetermined set of time and frequency resources to receive a request for random access from a device. For example, with reference to FIGS. 2, 3(a) and 3(b), the base station 204 monitors one or more blocks (e.g., block 302-1, 302-2, . . . , 302-8, 304-2, 304-4, 304-6, 352-1, 352-2, . . . ) to receive a request for random access from a UE 206. At 504, the base station determines a signal format of the request from among a plurality of signal formats. For example, with reference to FIG. 2, the base station 204 determines a signal format of the request from among signal format 210 and signal format 212. With reference to FIG. 3(a), the base station 204 may determine a signal format simply on the basis of the resource blocks of the received signal. In contrast, with reference to FIG. 3(b), because there is no a priori partition of resource blocks corresponding to a specific signal format, the base station 204 may try out (or test) multiple decoding possibilities in order to determine which signal format is actually used by the request. In this regard, the base station 204 may use a blind detection approach. At 506, the base station recovers the request based on the determined signal format. At 508, the base station decodes the request based on the determined signal format. Finally, at 510, the base station decodes the request using at least two of the plurality of signal formats. For example, with reference to FIG. 2, the base station 204 decodes the request using signal format 210 and signal format 212.

Figure 6:
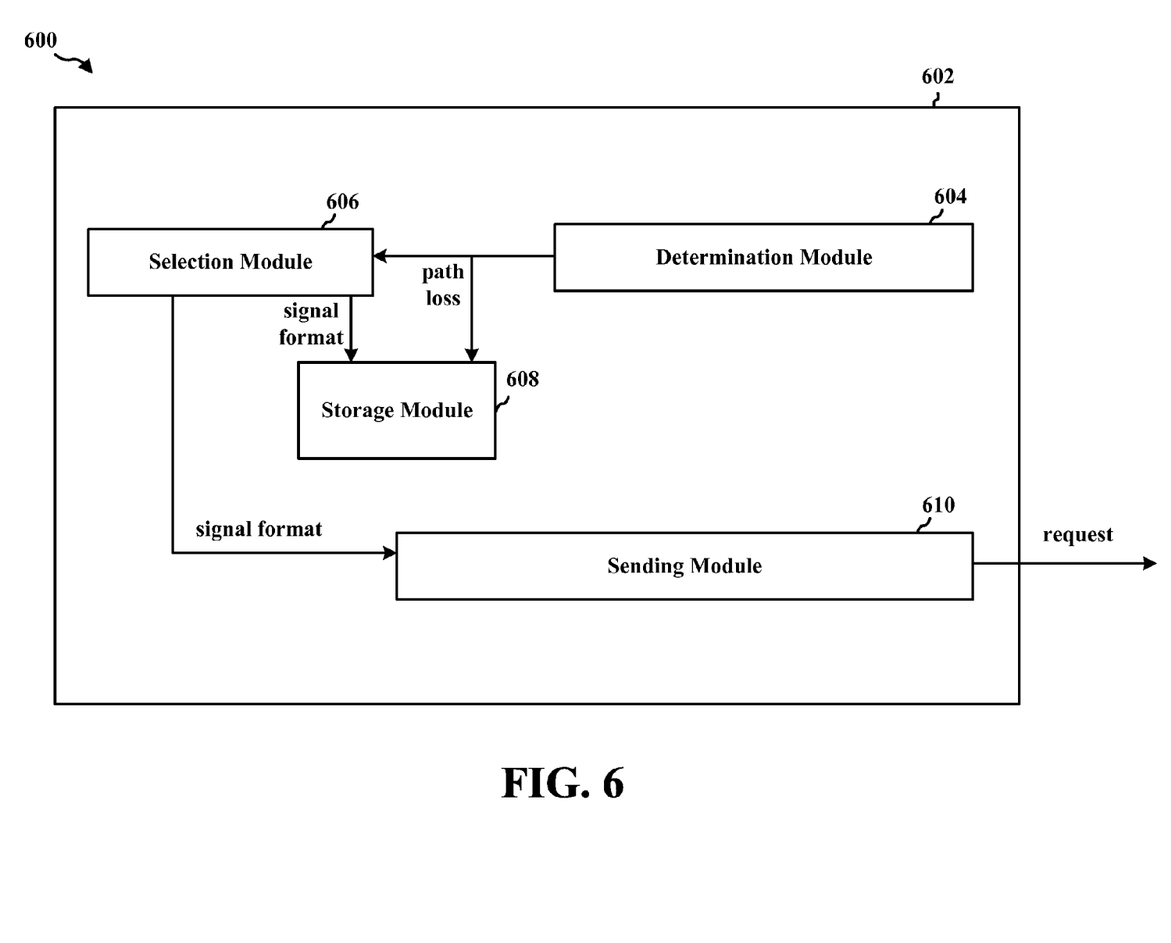
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus may be a UE. The apparatus 602 includes a determination module 604 that determines a path loss between the apparatus and a base station. The determined path loss is output to a selection module 606 and a storage module 608. The selection module 606 selects a signal format from a plurality of signal formats (e.g., signal formats 210 and 212 of FIG. 2). The selected signal format is output to the storage module 608 and the sending module 610. The selection module 606 may also select a time and frequency resource from a predetermined set of time and frequency resources corresponding to the selected signal format. For example, with reference to FIGS. 3(a) and 3(b), the selection module 606 selects a block corresponding to the selected signal format.

The sending module 610 sends a request for random access to the base station according to the selected signal format. The storage module 608 stores the determined path loss and/or the selected signal format to facilitate a subsequent request for random access.

The apparatus may include additional modules that perform each of the blocks of the algorithm in the aforementioned flow chart of FIG. 4. As such, each block in the aforementioned flow chart of FIG. 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
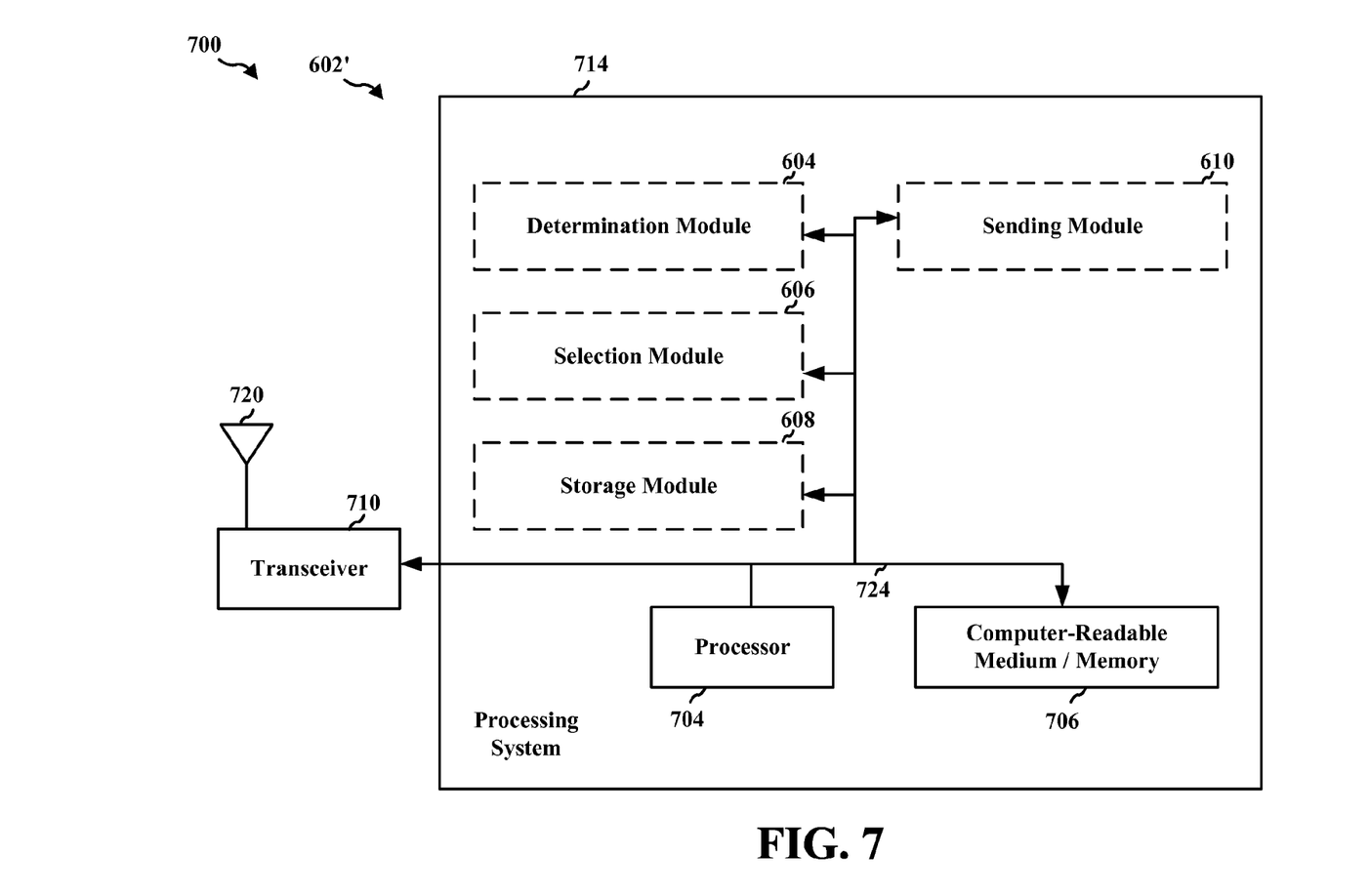
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 606, 608, 610, and the computer-readable medium/ memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the determination module 604. In addition, the transceiver 710 receives information from the processing system 714, specifically the sending module 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system further includes at least one of the modules 604, 606, 608, 610. The modules may be software modules running in the processor 704, resident/stored in the computer readable medium/memory 706, one or more hardware modules coupled to the processor 704, or some combination thereof. The processing system 714 may be a component of the UE 106, 206.

In one configuration, the apparatus 602/602' for wireless communication includes means for selecting (e.g., 606) a signal format from a plurality of signal formats, each of the plurality of signal formats corresponding to a respective coding and modulation scheme of a plurality of coding and modulation schemes. The apparatus further includes means for sending (e.g., 610) a request for random access to a base station according to the selected signal format.

In one configuration, each of the plurality of signal formats further corresponds to a predetermined set of non-overlapping time and frequency resources.

The apparatus may further include means for selecting (e.g., 606) a time and frequency resource from the predetermined set of non-overlapping time and frequency resources corresponding to the selected signal format. The means for sending (e.g., 610) may be configured to send the request for random access using the selected time and frequency resource.

In one configuration, the apparatus may further include means for receiving a signal from the base station (e.g., 720) and means for recovering (e.g., 606, 704) an allocation control message from the signal. The allocation control message specifies the signal formats corresponding to the predetermined set of non-overlapping time and frequency resources.

In one configuration, the plurality of signal formats further corresponds to a predetermined set of time and frequency resources. The apparatus may further include means for selecting (e.g., 606) a time and frequency resource from the predetermined set of time and frequency resources. The means for sending (e.g., 610) may be configured to send the request for random access using the selected time and frequency resource.

The apparatus may further include means for determining (e.g., 604) a path loss between the apparatus and the base station. Each of the plurality of signal formats may further correspond to a predetermined frequency bandwidth. A respective time duration is based on the respective coding and modulation scheme corresponding to each of the plurality of signal formats. The means for selecting (e.g., 606) the signal format may be configured to select the signal format based on the path loss. The means for selecting (e.g., 606) the signal format may also be configured to select the signal format based on a transmission-power capability of the apparatus.

In one configuration, the plurality of signal formats may be for OFDMA signals or SC-FDMA signals. The respective time duration may correspond to a predetermined number of symbols. The predetermined frequency bandwidth may correspond to a predetermined number of subcarriers.

In one configuration, the apparatus further includes means for storing (e.g., 608) the determined path loss at the apparatus to facilitate a subsequent request for random access.

In one configuration, the coding and modulation scheme corresponding to a first signal format of the plurality of signal formats and the coding and modulation scheme corresponding to a second signal format of the plurality of signal formats are different from each other. The signal format may be selected such that a robustness of the coding and modulation scheme corresponding to the selected signal format is commensurate with the path loss between the apparatus and the base station.

The signal format may be selected further such that, if the path loss is less than a threshold value, the coding and modulation scheme corresponding to the selected signal format is less robust than the coding and modulation scheme corresponding to a second signal format of the plurality of signal formats. The signal format may be selected further such that, if the path loss is greater than a threshold value, the coding and modulation scheme corresponding to the selected signal format is more robust than the coding and modulation scheme corresponding to a second signal format of the plurality of signal formats.

The apparatus may further include means for storing (e.g., 608) the selected signal format to facilitate a subsequent request for random access.

In one configuration, the request for random access is sent to facilitate sending of an IoT communication to the base station.

The aforementioned means may be one or more of the aforementioned modules of the apparatus 602 and/or the processing system 714 of the apparatus 602' configured to perform the functions recited by the aforementioned means.

Figure 8:
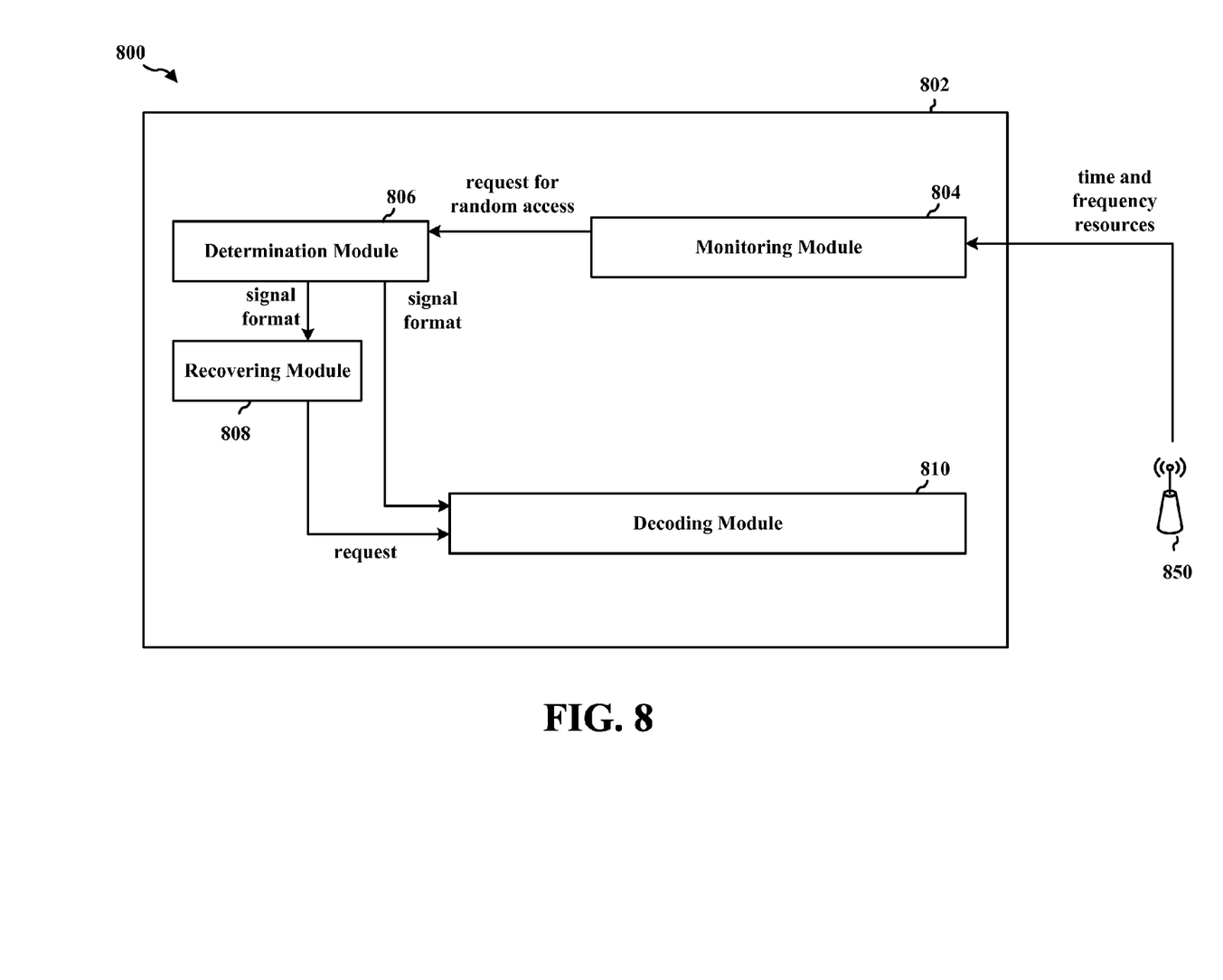
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be a base station. The apparatus 802 includes a monitoring module 804 that monitors a predetermined set of time and frequency resources (from transceiver 850) to receive a request for random access from a device. For example, with reference to FIGS. 2, 3(a) and 3(b), the monitoring module 804 monitors one or more blocks (e.g., block 302-1, 302-2, . . . , 302-8, 304-2, 304-4, 304-6, 352-1, 352-2, . . . ) to receive a request for random access from a UE 206. The received request is output to determination module 806. The determination module 806 determines a signal format of the request from among a plurality of signal formats. For example, with reference to FIG. 2, the determination module 806 determines a signal format of the request from among signal format 210 and signal format 212. The determined signal format is output to the recovering module 808 and the decoding module 810. The recovering module 808 recovers the request based on the determined signal format. The recovered request may be output to the decoding module 810. The decoding module 810 may decode the request based on the determined signal format. The decoding module 810 may decode the request using at least two of the plurality of signal formats. For example, with reference to FIG. 2, the decoding module 810 may decode the request using signal format 210 and signal format 212.

The apparatus may include additional modules that perform each of the blocks of the algorithm in the aforementioned flow chart of FIG. 5. As such, each block in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
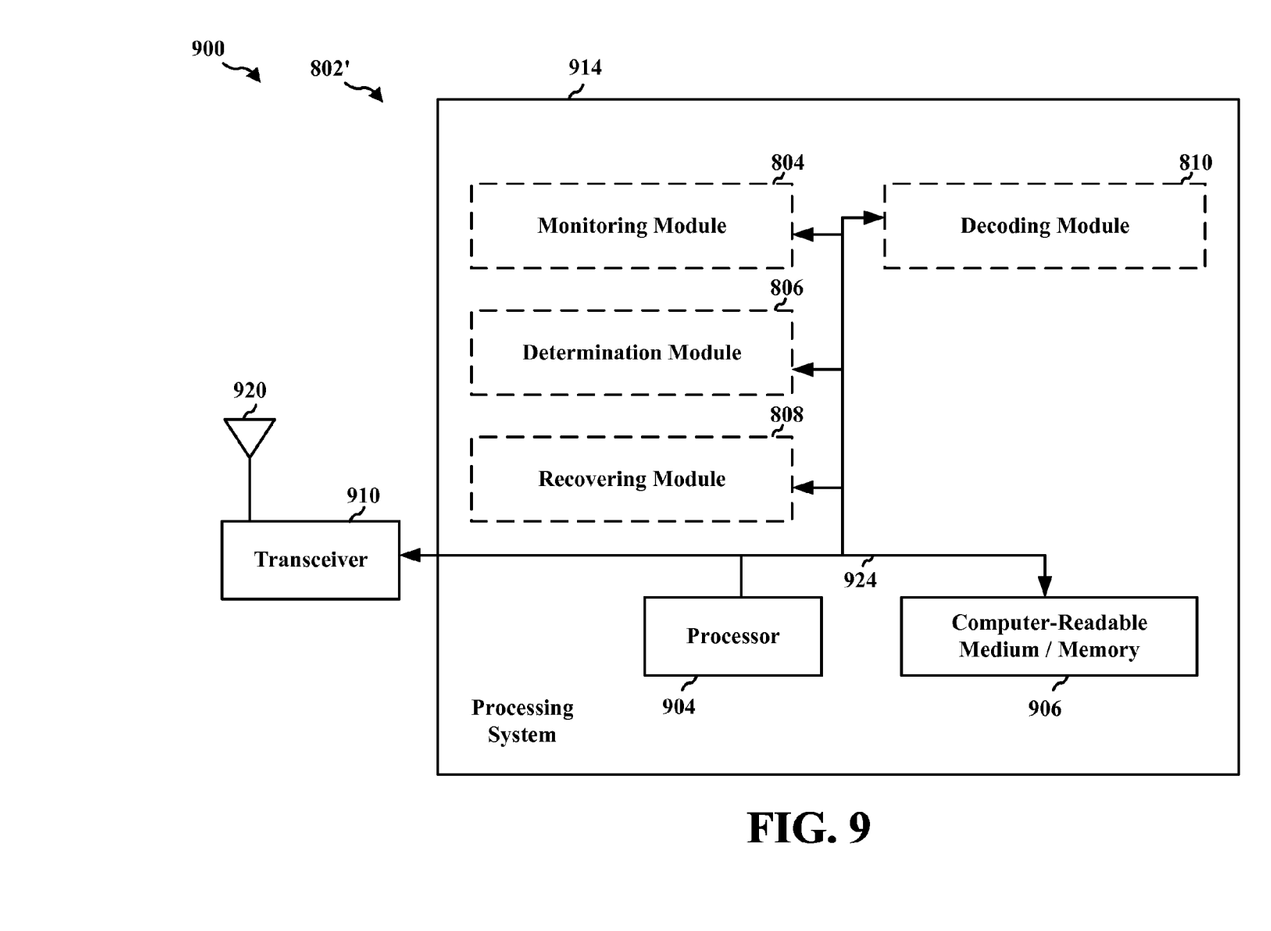
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the monitoring module 804. In addition, the transceiver 910 may receive information from the processing system 914, and, based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808, 810. The modules may be software modules running in the processor 904, resident/stored in the computer readable medium/memory 906, one or more hardware modules coupled to the processor 904, or some combination thereof. The processing system 914 may be a component of the base station 104, 204.

In one configuration, the apparatus 802'/702' for wireless communication includes means for monitoring (e.g., 804) a predetermined set of time and frequency resources to receive a request for random access from a device. The apparatus further includes means for determining (e.g., 806) a signal format of the request from among a plurality of signal formats. Each of the plurality of signal formats corresponds to a respective coding and modulation scheme of a plurality of coding and modulation schemes. The apparatus further includes means for recovering (e.g., 808) the request based on the determined signal format.

In one configuration, each of the plurality of signal formats may further correspond to a predetermined frequency bandwidth. A respective time duration may be based on the respective coding and modulation scheme corresponding to each of the plurality of signal formats.

In one configuration, each of the plurality of signal formats may further correspond to a predetermined non-overlapping subset of the predetermined set of time and frequency resources. The signal format of the request may be determined from the predetermined non-overlapping subset monitored. The apparatus may further include means for decoding (e.g., 810) the request based on the determined signal format.

The apparatus may further include means for decoding (e.g., 810) the request using at least two of the plurality of signal formats. The signal format of the request may be determined by one of the at least two of the plurality of signal formats that successfully decodes the request.

In one configuration, the signal format may be determined based on at least a time at which the request is received or a carrier frequency on which the request is received.

In one configuration, the received request may start with a known preamble. The known preamble may be common to the plurality of signal formats.

In one configuration, the coding and modulation scheme corresponding to a first signal format of the plurality of signal formats and the coding and modulation scheme corresponding to a second signal format of the plurality of signal formats may be different from each other.

The aforementioned means may be one or more of the aforementioned modules of the apparatus 802 and/or the processing system 914 of the apparatus 802' configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein

What is claimed is:

1. A method of operating a base station, comprising:
monitoring a predetermined set of time and frequency resources to receive a request for random access from a device, wherein the received request starts with a known preamble common to a plurality of signal formats;
determining a signal format of the request from among the plurality of signal formats based on the known preamble, each of the plurality of signal formats corresponding to a respective coding and modulation scheme of a plurality of coding and modulation schemes such that the determined signal format corresponds to a first coding and modulation scheme of the plurality of coding and modulation schemes, wherein the coding and modulation scheme corresponding to the determined signal format is determined based on a transmission-power capability of the device; and
recovering the request based on the determined signal format.

2. The method of claim 1, wherein:
each of the plurality of signal formats further corresponds to a predetermined frequency bandwidth,
wherein a respective time duration is based on the respective coding and modulation scheme corresponding to each of the plurality of signal formats.

3. The method of claim 2,
wherein each of the plurality of signal formats further corresponds to a predetermined non-overlapping subset of the predetermined set of time and frequency resources,
wherein the signal format of the request is determined from the predetermined non-overlapping subset monitored, and
wherein the method further comprises decoding the request based on the determined signal format.

4. The method of claim 2, further comprising decoding the request using at least two of the plurality of signal formats, wherein the signal format of the request is determined by one of the at least two of the plurality of signal formats that successfully decodes the request.

5. The method of claim 1, wherein the signal format is determined based on at least a time at which the request is received or a carrier frequency on which the request is received.

6. The method of claim 1, wherein the coding and modulation scheme corresponding to a first signal format of the plurality of signal formats and the coding and modulation scheme corresponding to a second signal format of the plurality of signal formats are different from each other.

7. An apparatus for wireless communication, comprising:
a memory; and
at least one processor coupled to the memory and configured to:
monitor a predetermined set of time and frequency resources to receive a request for random access from a device, wherein the received request starts with a known preamble common to a plurality of signal formats;
determine a signal format of the request from among the plurality of signal formats based on the known preamble, each of the plurality of signal formats corresponding to a respective coding and modulation scheme of a plurality of coding and modulation schemes such that the selected signal format corresponds to a first coding and modulation scheme of the plurality of coding and modulation schemes, wherein the coding and modulation scheme corresponding to the determined signal format is determined based on a transmission-power capability of the device; and
recover the request based on the determined signal format.

8. The apparatus of claim 7, wherein the coding and modulation scheme corresponding to a first signal format of the plurality of signal formats and the coding and modulation scheme corresponding to a second signal format of the plurality of signal formats are different from each other.

9. The apparatus of claim 7, wherein:
each of the plurality of signal formats further corresponds to a predetermined frequency bandwidth,
wherein a respective time duration is based on the respective coding and modulation scheme corresponding to each of the plurality of signal formats.

10. The apparatus of claim 7, wherein the at least one processor is further configured to decode the request using at least two of the plurality of signal formats, wherein the signal format of the request is determined by one of the at least two of the plurality of signal formats that successfully decodes the request.

* * * * *